United States Patent [19]

Iwasaki

[11] 4,339,953
[45] Jul. 20, 1982

[54] POSITION SENSOR

[75] Inventor: Shinichiro Iwasaki, Auburn Heights, Mich.

[73] Assignee: Aisin Seiki Company, Ltd., Kariya, Japan

[21] Appl. No.: 182,842

[22] Filed: Aug. 29, 1980

[51] Int. Cl.³ .............................................. G01H 11/00
[52] U.S. Cl. ........................................ 73/654; 324/208
[58] Field of Search ................. 73/517 R, 517 B, 654; 324/207, 208; 336/30, 110

[56] References Cited

U.S. PATENT DOCUMENTS 4,140,971  2/1979  Blincoe ................................ 324/208

FOREIGN PATENT DOCUMENTS 909023  10/1962  United Kingdom ................. 324/207

*Primary Examiner*—James J. Gill
*Attorney, Agent, or Firm*—Oblon, Fisher, Spivak, McClelland & Maier

[57] ABSTRACT

A position sensor comprising a ferromagnetic member operatively connected to an operation means and movable in response to displacement of the operation means, a magnetically soft member surrounded by an electrical coil secured adjacent to a range of movement of the ferromagnetic member, and a displacement pulse phase conversion unit including a permanent magnet. Voltage pulses are applied to one end of the electrical coil, the other end of which is connected in series with a resistor. A voltage drop across the resistor is detected and a time lag of the resistor voltage, which time lag corresponds to displacement of the operation means, is provided in the form of an analog voltage or a digital code.

6 Claims, 37 Drawing Figures

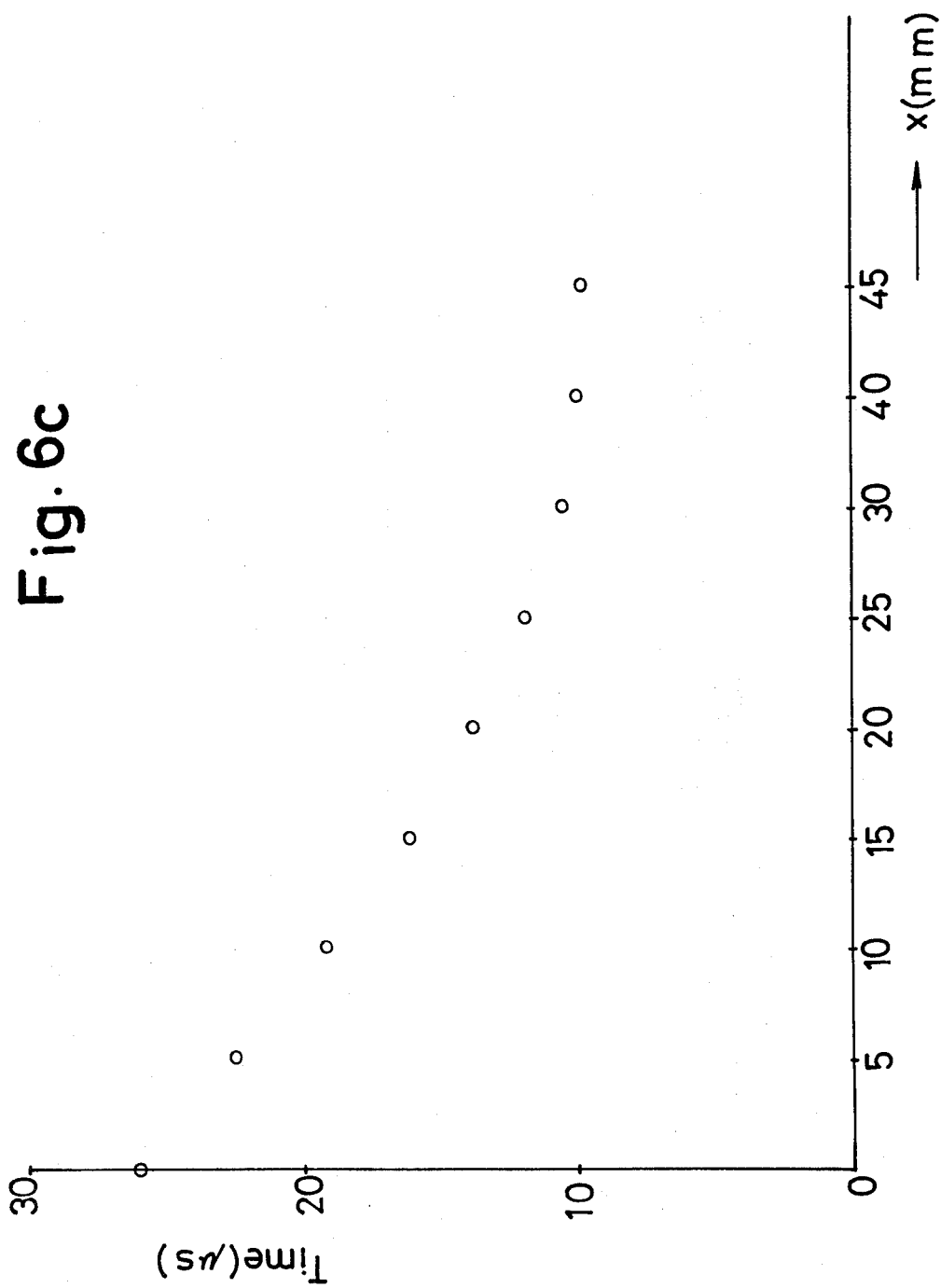

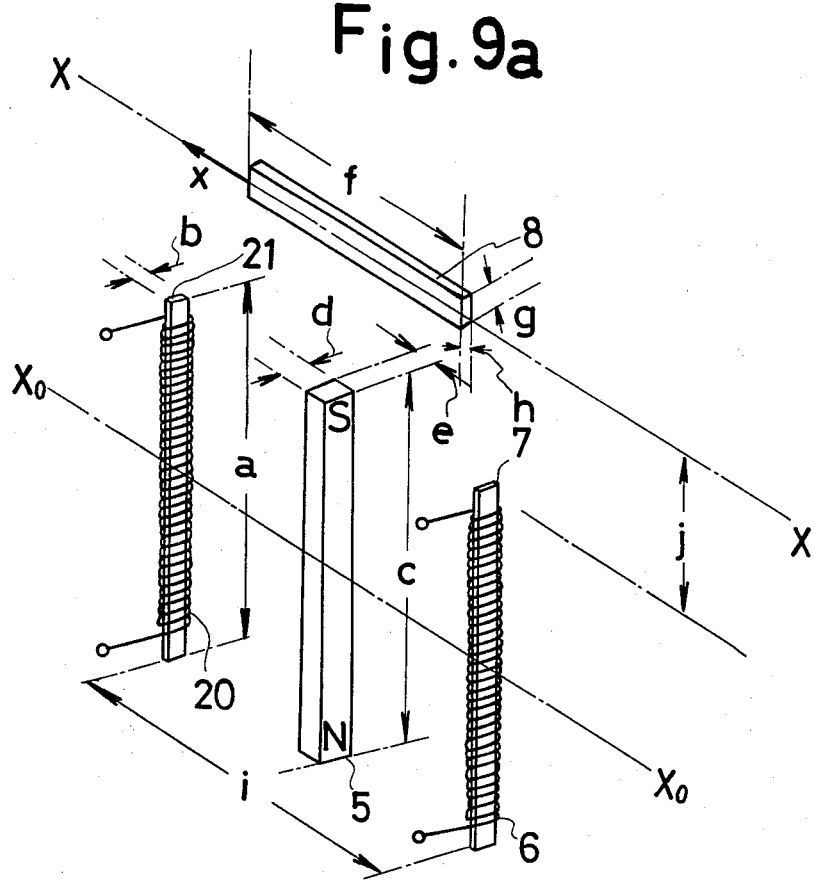
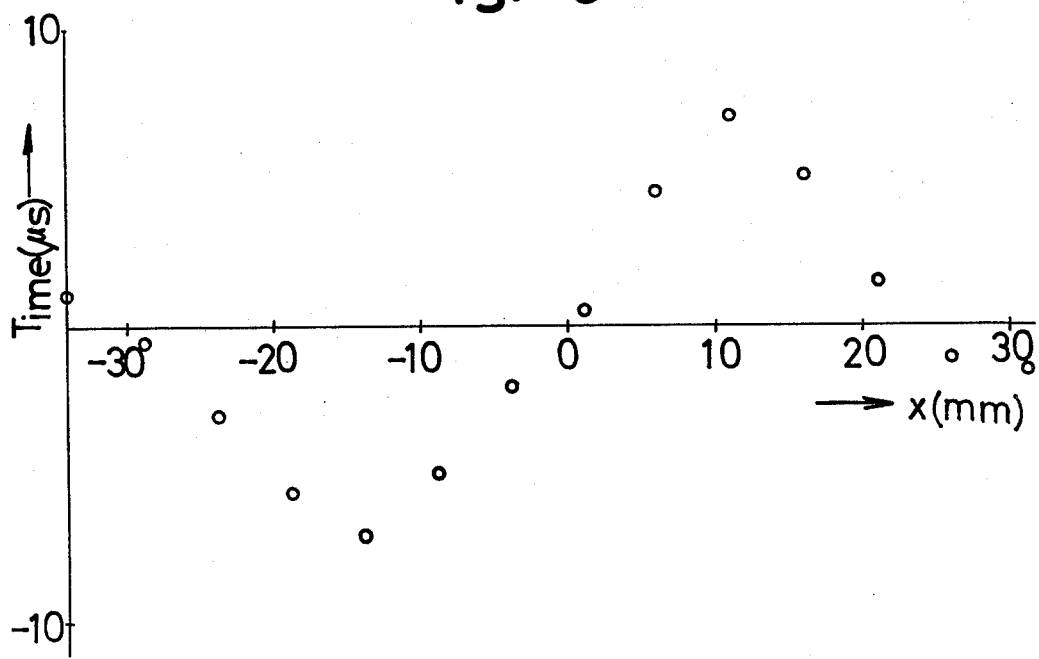

POSITION SENSOR

BACKGROUND OF THE INVENTION

1. Field of the Invention

This invention relates to a position sensor and particularly to a position sensor for converting an operational displacement position of an operation member to electrical signal.

2. Description of the Prior Art

In a conventional arrangement, a potentiometer in which a slider is connected to an operational displacement member is provided. In such arrangement an analog voltage corresponding to operational displacement position of the operational displacement member is obtained from the potentiometer.

With this position sensor, it is desirable that a thin film resistor forming the potentiometer exhibits a high abrasion resistance and provides a stabilized reading of an output voltage for a given slider position. It is also desired that the operational displacement member and the slider are mechanically connected together with a minimal degree of rattling and that a stabilized contact is maintained between the slider and the thin film resistor in the presence of oscillation or shock.

However, because the slider is brought into contact with the thin film resistor under pressure, an abrasion or oscillations may cause production of an unstable output voltage with respect to the displacement position of the operational displacement member.

SUMMARY OF THE INVENTION

Accordingly, a primary object of this invention is to provide a novel position sensor including displacement conversion means of the non-contact type in which no mechanical contact mechanism is involved in a mechanical-to-electrical conversion system which converts a mechanical displacement into a corresponding electrical signal.

A further object of the invention is to provide a novel position sensor solidly constructed and having high resistance to oscillations and shocks.

It is a further object of the invention to provide a novel position sensor which only requires relatively simple electrical processing of a detection signal indicative of the operational displacement of the operation means.

It is a further object of the invention to provide a novel position sensor capable of providing operational displacement data read-out with relatively simple read-out logic in the form of a large scale integrated circuit such as microcomputer, the technology of which has been greatly advanced recently.

These and other objects are achieved in accordance with the invention by providing a novel position sensor which includes a ferromagnetic member movable in response to operation of an operation member of which displacement position is to be detected, a magnetically soft member surrounded by an electrical coil secured adjacent to a range of movement of the ferromagnetic member, and a displacement-pulse phase conversion unit including a permanent magnet. The magnetically soft member has a transverse cross section of a reduced magnitude so that magnetic saturation is easily achieved and consequently the movable ferromagnetic member which controls the magnetic flux produced by an outside magnetic field applied to the magnetically soft member can be also small in its size. The electrical coil has an increased number of turns so that the magnetically soft member can be magnetically saturated with a relatively low voltage or at a relatively low current level.

The permanent magnet is physically reduced while being compatible with providing to the magnetically soft member a magnetic field of a magnetic which depends on the travel of the ferromagnetic member within the predetermined extent of the latter.

The time T required for the magnetically soft member arranged in a predetermined space relative to the fixed permanent magnet to saturate from the instant of application of a voltage to the coil disposed on the magnetically soft member can be expressed approximately as follows:

$$T = (N/E)(\Phi_m - \Phi_x) \quad (1)$$

where E represents the voltage applied, N the number of turns in the coil, $\Phi_m$ the maximum flux which is approximately equivalent to the saturation flux and $\Phi_x$ a flux attributable to an external magnetic field applied to the magnetically soft member through the ferromagnetic member. As the magnitude of flux changes in response to a movement of the member, the value of T also changes. In this manner, as the ferromagnetic member is displaced in response to the displacement position of the operation means to cause a change in the external flux $\Phi_x$ applied to the magnetically soft member, the length of time T from the application of voltage to the coil until the coil current reaches a given level changes. Accordingly, in the position sensor of the invention, an electrical circuit or a semiconductor electronic device is provided which determines the value of T and provides an electrical signal in the form of a voltage level or a digital code indicative of such value.

In a preferred embodiment of the invention, an amorphous magnetic material is used to form the magnetically soft member. Since an amorphous magnetic member must be manufactured by quenching from a liquid phase metal, it is formed as a thin sheet. It exhibits a ferromagnetism and has a high level of magnetic saturation, high permeability, ($\mu_{max} > 10^3$) and a low level of coercive force ($< 1.0$ Oe) while exhibiting a very high breaking strength and an excellent resiliency and stability. Such properties of an amorphous material are very preferred for use in the position sensor of this invention. Its use advantageously facilitates signal processing and increases the accuracy in the determination of the value of T. In addition, in mechanical aspects, the manufacturing is simplified while the resistance to oscillations or shocks is improved. Further, in a preferred embodiment of this invention, an amorphous substance or soft iron is used to form the ferromagnetic member. Since the magnetically soft member has high permeability, changes of the external flux applied to the magnetically soft member can be assured with high efficiency even if the changes are relatively small.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1b is a cross-sectional view taken along the line A—A in FIG. 1a;

FIG. 2b is a graph which shows the waveforms of input and output signals to or from the processing circuit shown in FIG. 2a;

FIG. 3b is a graph which illustrates the waveforms of input and output signals of the processing circuit shown in FIG. 3a;

FIG. 6b is a graph which shows voltage data indicative of the time lag which varies in accordance with the displacement position x of a 50 mm long member in the X—X direction utilizing the arrangement illustrated in FIG. 6a when the electrical coil is connected to the electrical processing circuit shown in FIG. 2a;

FIG. 6c is a graph which shows data for time lag pulse width with the displacement position x of a 50 mm long ferromagnetic member in the X—X direction utilizing the arrangement illustrated in FIG. 6a when the electrical coil is connected to the electrical processing circuit shown in FIG. 3a;

FIG. 7b is a cross-sectional view of the position sensor shown in FIG. 7a;

FIG. 9a is a perspective view illustrating the relative position of a ferromagnetic member to magnetically soft members and a permanent magnet, when each time lag of electrical coils corresponding to the position of the ferromagnetic member relative to the magnetically soft member and the permanent magnet is determined experimentally;

FIG. 9b is a graph which shows voltage data indicative of a time lag which varies in accordance with the displacement position x of a 25 mm long ferromagnetic member in the X—X direction, utilizing the arrangement shown in FIG. 9a and a pair of electrical coils spaced apart by 50 mm and connected to the electrical processing circuit shown in FIG. 8a;

FIG. 9c is a graph which shows data for each difference of a time lag pulse width in respect to the displacement position x of a 25 mm long ferromagnetic member in the X—X direction, utilizing the arrangement shown in FIG. 9a and a pair of electrical coils spaced apart by 50 mm and connected to the electrical processing circuit shown in FIG. 3a as shown in FIG. 8a, respectively;

FIG. 10b is a cross-sectional view taken along the line C—C in FIG. 10a;

FIG. 12b is a cross-sectional view taken along the line D—D in FIG. 12a;

FIG. 13b is a graph which shows voltage data indicative of a time lag produced by displacement of the ferromagnetic member shown in FIG. 13a;

FIG. 14b is a cross-sectional view taken along the line E—E in FIG. 14a;

FIG. 15b is a graph which shows voltage data indicative of a time lag produced by a displacement of the ferromagnetic member in the arrangement of FIG. 15a;

FIG. 16b is a cross-sectional view taken along the line F—F in FIG. 16a;

FIG. 17b is a cross-sectional view taken along the line G—G in FIG. 17a;

FIG. 18b is a cross-sectional view taken along the line H—H in FIG. 18a.

DESCRIPTION OF THE PREFERRED EMBODIMENTS

Figure 1A:
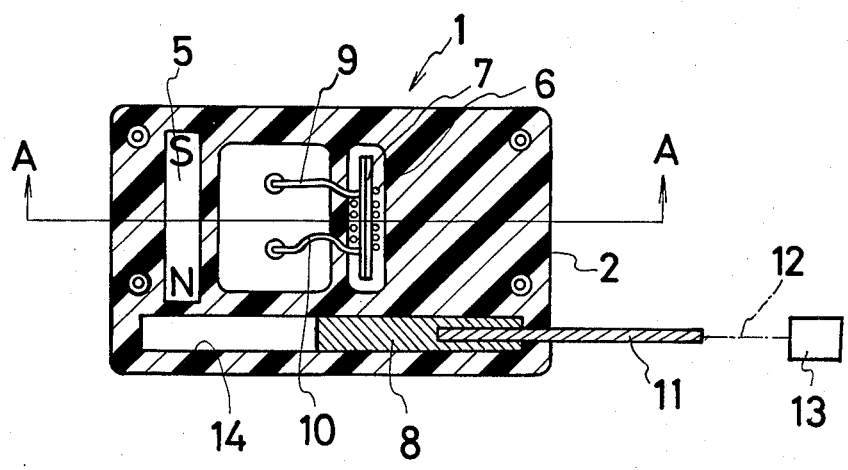
FIG. 1a is a longitudinal cross-sectional view of a position sensor according to one embodiment of the invention.

Referring now to the drawings, wherein like reference numerals designate identical or corresponding parts throughout the several views, and more particularly to FIGS. 1a-6c, a first embodiment of the invention is firstly described.

First Embodiment, FIGS. 1a to 6c

Figure 1B:
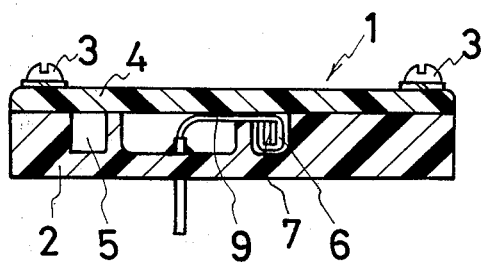

In the embodiment shown in FIGS. 1a and 1b, a position sensor 1 includes a body 2 formed of resin material and a cover 4 secured to the body 2 through a proper number of bolts 3. The body 2 is provided with a proper number of recesses in which a permanent magnet 5, a magnetically soft member 7 surrounded by electrical coils 6 and a ferromagnetic member 8 are disposed. The permanent magnet 5 and the magnetically soft member 7 are both secured to the inside of the body 2 and arranged in parallel to each longitudinal direction. The magnetically soft member 7 is formed by a plural of stacked sheet materials. Both ends 9, 19 of the electrical coil extend outside of the body through respective leads. The member 8 is secured to one end of a non-magnetic connecting rod member 11, the other end of which is connected to an operation means 13a through a connecting means 12 such as proper link mechanism. Accordingly, the member 8 is displaced in the recess 14 of the body 2 in the direction normal to the longitudinal axes of the permanent magnet 5 and the magnetically soft member 7 via movement of the connecting means 12 in response to operational displacement in the position of the operation means 13a.

Thus, the member 8 changes the magnetic flux produced by the outer magnetic field applied from the permanent magnet 5 in the magnetically soft member 7 in response to the displacement position of the member 8. This change is detected by an electrical processing circuit of an electronic logical processing unit, whereby the operational displacement position of the operation means is electrically detected.

Figure 2A:
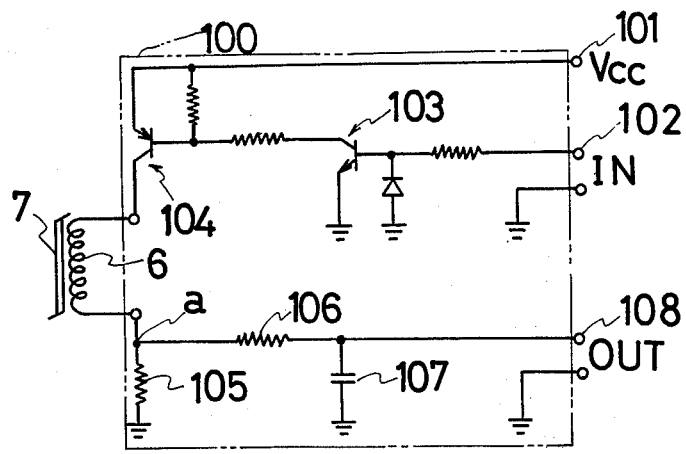
FIG. 2a is a circuit diagram of an electrical processing circuit connected to the position sensor shown in FIGS. 1a and 1b for producing an analog voltage of a level which corresponds to the position detected.

FIG. 2a shows one form of an electrical processing circuit 100. The circuit 100 includes a terminal 101 adapted to be connected with a given d.c. voltage $V_{CC}$, on the order of +5 V, for example. The circuit also includes an input terminal 102, to which a voltage pulse having a frequency on the order of 5-25 kHz, for example, is applied. As NPN transistor 103 which has its base connected to the terminal 102 is rendered conductive during the time the pulse voltage remains positive, and is rendered non-conductive when the pulse voltage assumes a ground level. A voltage proportional to a current flow through the coil 6 is developed across a resistor 105, and is integrated by an integrator formed by a resistor 106 and a capacitor 207, with the integrated voltage appearing at an output terminal 108.

Figure 2B:
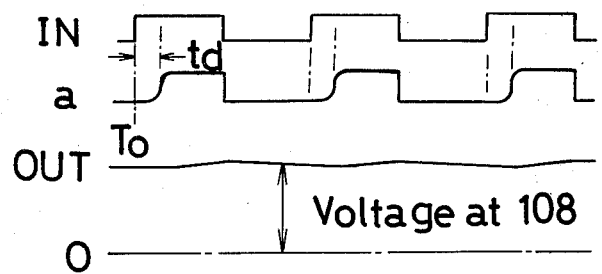

FIG. 2b graphically shows the waveform of the input and the output voltages of the circuit shown in FIG. 2a. The time lag td from the rising edge of the input voltage (IN) until the voltage across the resistor 105 exceeds a given level, as well as the integrated $V_x$, which represents an integral of the voltage across the resistor 105, both depend on the location of the ferromagnetic member 8.

Figure 3A:
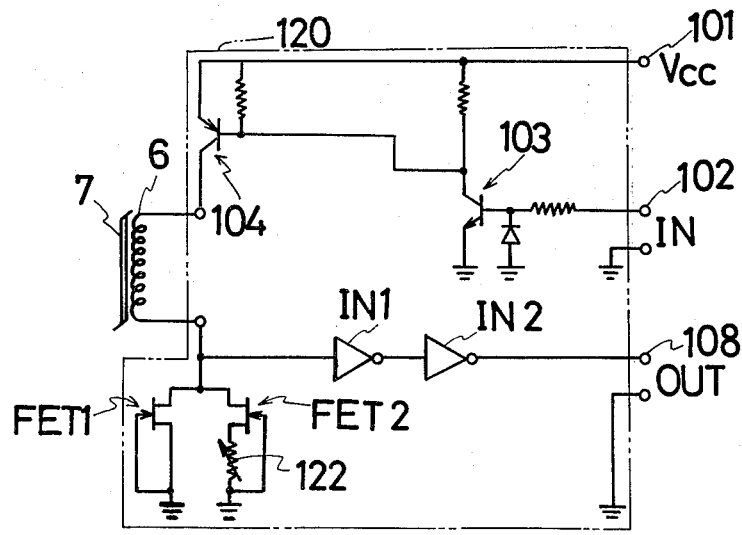
FIG. 3a is a circuit diagram of another electrical processing circuit connected to the position sensor shown in FIGS. 1a and 1b for deriving a pulse indicative of a time lag corresponding to the position detected.

FIG. 3a illustrates another electrical processing circuit 120. In this instance PNP transistor 104 is turned on during the time when the input voltage (IN) is positive; thus enabling the application of a voltage to the coil 6. During the time the input voltage (IN) assumes the ground level, the transistor 103 is turned off, and the PNP transistor 104 is also turned off. A pair of junction N-channel field effect transistors FET 1 and FET 2 form together a constant current source and maintain a constant current flow through the coil. The current level through FET 2 can be adjusted by means of a variable resistor 122. The voltage developed at the terminal of the coil which is connected to FET 1 and FET 2 is fed to a pair of cascade connected inverting amplifiers IN 1 and IN 2, which amplify and shape this voltage.

Figure 3B:
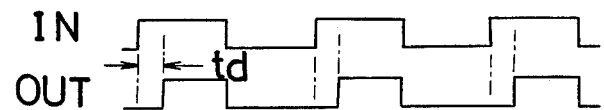

FIG. 3b graphically shows the waveforms of an input voltage and output voltage of the circuit of FIG. 3a. The circuit 102 produces an output (OUT) which is a voltage pulse which is delayed by a time lag td with respect to an input pulse (IN), and the magnitude of time lag depends on the location of the ferromagnetic member 8.

Figure 4:
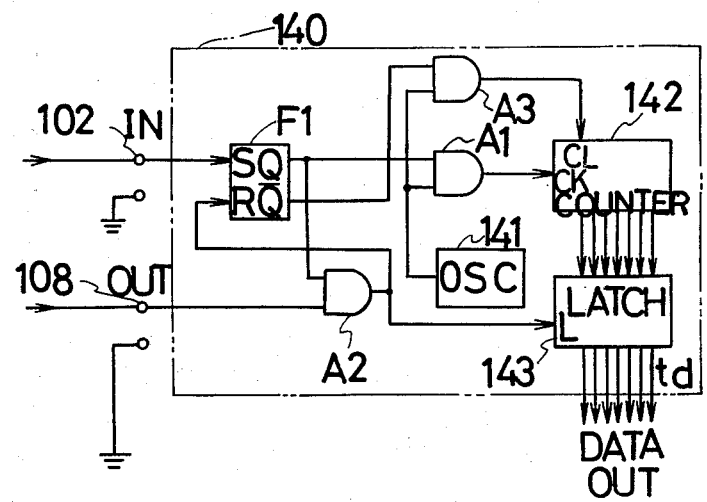
FIG. 4 is a block diagram of a counter circuit which converts a time lag between an input pulse and an output pulse from the processing circuit of FIG. 3a into a digital code.

FIG. 4 shows a counter circuit 140 which converts the magnitude of td into a corresponding digital code. In the circuit of FIG. 4, the rising edge of an input voltage (IN) sets a flipflop F1, whereby its Q output changes to a high level or "1", which enables an AND gate A1 to pass a pulse produced by a clock pulse oscillator 141 to a count pulse input CK of a counter 142. An output pulse (OUT) and the Q output of the flipflop F1 are applied to an AND gate A2, which produces a high level or "1" when the output pulse (OUT) rises to a high level. At this point in time, the flipflop F1 is reset, with its Q output reverting to a low level or "0". This disables the AND gate A1, and hence the supply of clock pulses to the counter 142 is interrupted. At the time when the AND gate A2 produces a "1" output, a code indicative of the count in the counter 142 is stored in a latch 143. After the flipflop F1 is reset and the latch 143 has been loaded with the count code, an AND gate A3 passes a clock pulse to clear the counter 142. An output code from the latch 143 indicates the number of clock pulses passed during the time interval of td, and hence represents the magnitude of td.

Figure 5:
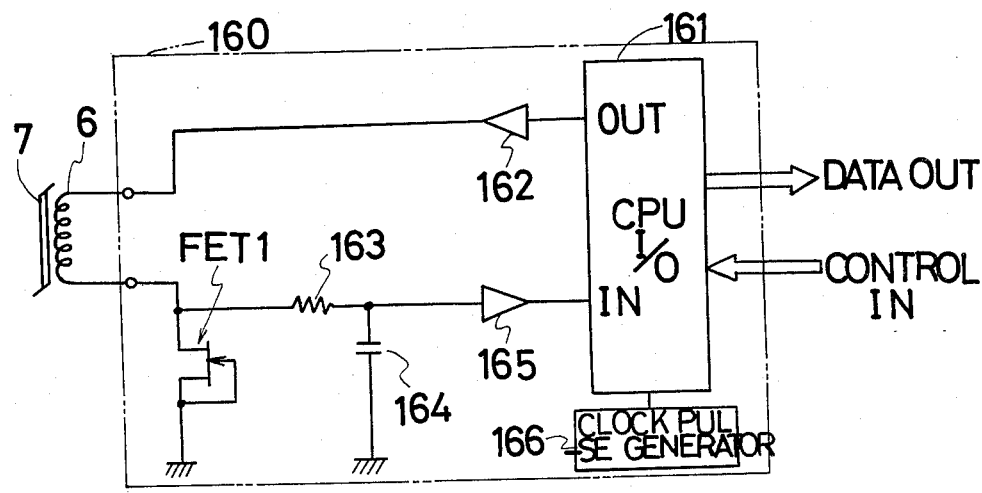
FIG. 5 is a block diagram of an electronic processing unit connected to the position sensor shown in FIGS. 1a and 1b for determining a time lag of the rising edge of current flowing through an electrical coil of the position sensor in response to a pulse voltage applied thereto from a single chip microcomputer.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which removes voltage oscillations of higher frequencies than the frequency of the input and the output pulses. The microcomputer 161 generates input pulses of a given frequency in a range from 5 to 30 kHz based on the clock pulses applied from the clock pulse generator and feeds the input pulses to the amplifier 162. On the other hand, the microcomputer 161 monitors the voltage developed at the junction between the N-channel FET 1 and one end of the coil, or the output voltage of the amplifier 165, and counts the clock pulses which are developed during the time from the rising edge of the pulse output by itself until the output voltage of the amplifier 165 rises to a given level. Such time interval correspond to $t_d$, and the microcomputer forms an output code indicative of the value of $t_d$ (DATA OUT).

As discussed above, the position sensor shown in FIGS. 1a and 1b may be connected to a variety of electrical processing circuits or an electronic logical processing unit to provide an electrical signal indicative of the location of the ferromagnetic member 8 of the position sensor 1.

Figure 6A:
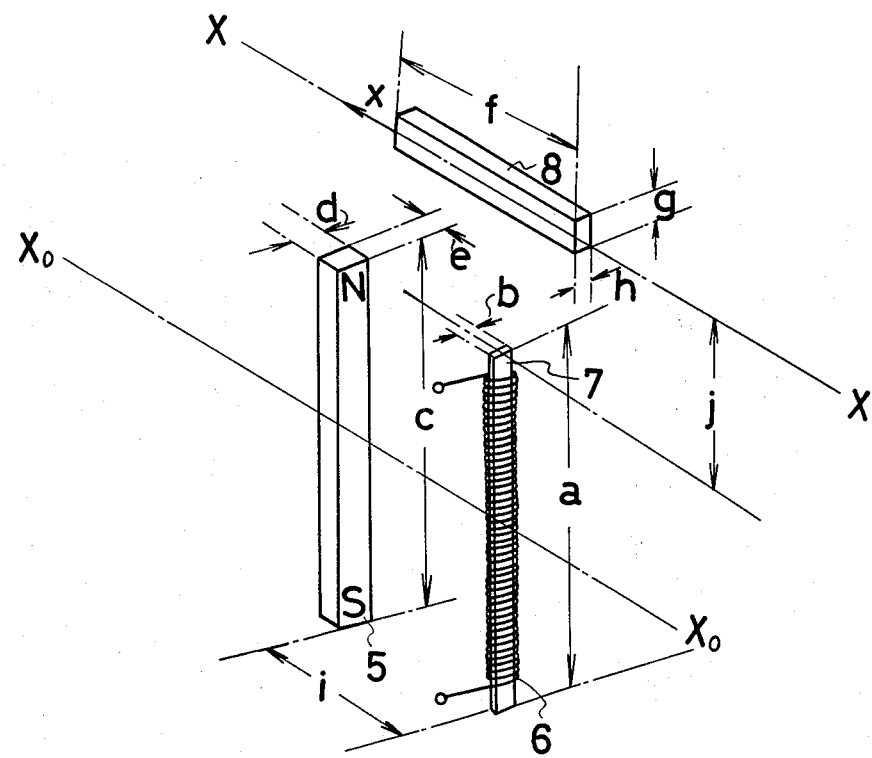
FIG. 6a is a perspective view illustrating the relative position of a ferromagnetic member to a magnetically soft member and a permanent magnet, which arrangement is used in determining a time lag which varies in accordance with the relative location of the ferromagnetic member to the magnetically soft member and the permanent magnet.

Nextly, the use of a position sensor 1 shown in FIGS. 1a and 1b in combination with one of the electrical processing circuits 100, 120, 140 or the logical processing unit 160 to derive an electrical signal corresponding to operational displacement position of the operation means is described. Initially, operational displacement position of the operation means 13 is converted to the position of the ferromagnetic member 8. Then, the conversion of the position of the member 8 into an electrical signal will be described with reference to experimental data shown in FIGS. 6b and 6c. The inventor has fixedly mounted the magnetically soft member 7 and the permanent magnet 5 in parallel as shown in FIG. 6a. An $X_O$—$X_O$ axis is chosen so as to pass through the magnetically soft member 7 and the permanent magnet 5 in a direction perpendicular to the length thereof, and on a X—X axis parallel to the $X_O$—$X_O$ axis the member 8 is movably disposed in a space separated from the magnetically soft member 7 by a determined distance j. The origin of the X—X axis is defined as the point along the X—x axis at which the left end of the member 8 (FIG. 6a) intersects the vertical extension of the longitudinal axis of the magnetically soft member 7. Then the values of voltage V(x) indicative of time lag and pulse width ($\mu$s) of the time lag in regard to a positive displacement of the member 8 in the X—X direction towards the magnet from the origin (x=0) has been determined. The following Table 1 indicates the relationship of the data obtained with regard to sizes a--j indicative of shape and locations, and materials.

TABLE 1

| Case No. | Magnetically soft member 7 | | | | | Coil 6 | Permanent magnet 5 | | |
| | material atomic weight percent | Thickness mm | a mm | b mm | Number of sheet | Number of turns | Number of mm | c mm | d mm | e mm |
| --- | --- | --- | --- | --- | --- | --- | --- | --- | --- |
| 1 | Fe$_{40}$Ni$_{40}$P$_{14}$B$_6$ Amorphous | 0.058 | 40 | 1.8 | 4 | 1000 | 40 | 5 | 5 |
| 2 | Fe$_{40}$Ni$_{40}$P$_{14}$B$_6$ Amorphous | " | " | " | " | " | " | " | " |
| 5 | Fe$_{40}$Ni$_{40}$P$_{14}$B$_6$ Amorphous | " | " | " | " | " | " | " | " |
| 6 | Fe$_{40}$Ni$_{40}$P$_{14}$B$_6$ Amorphous | " | " | " | " | " | " | " | " |
| 7 | Fe$_{40}$Ni$_{40}$P$_{14}$B$_6$ Amorphous | " | " | " | " | " | " | " | " |

Figure 6B:
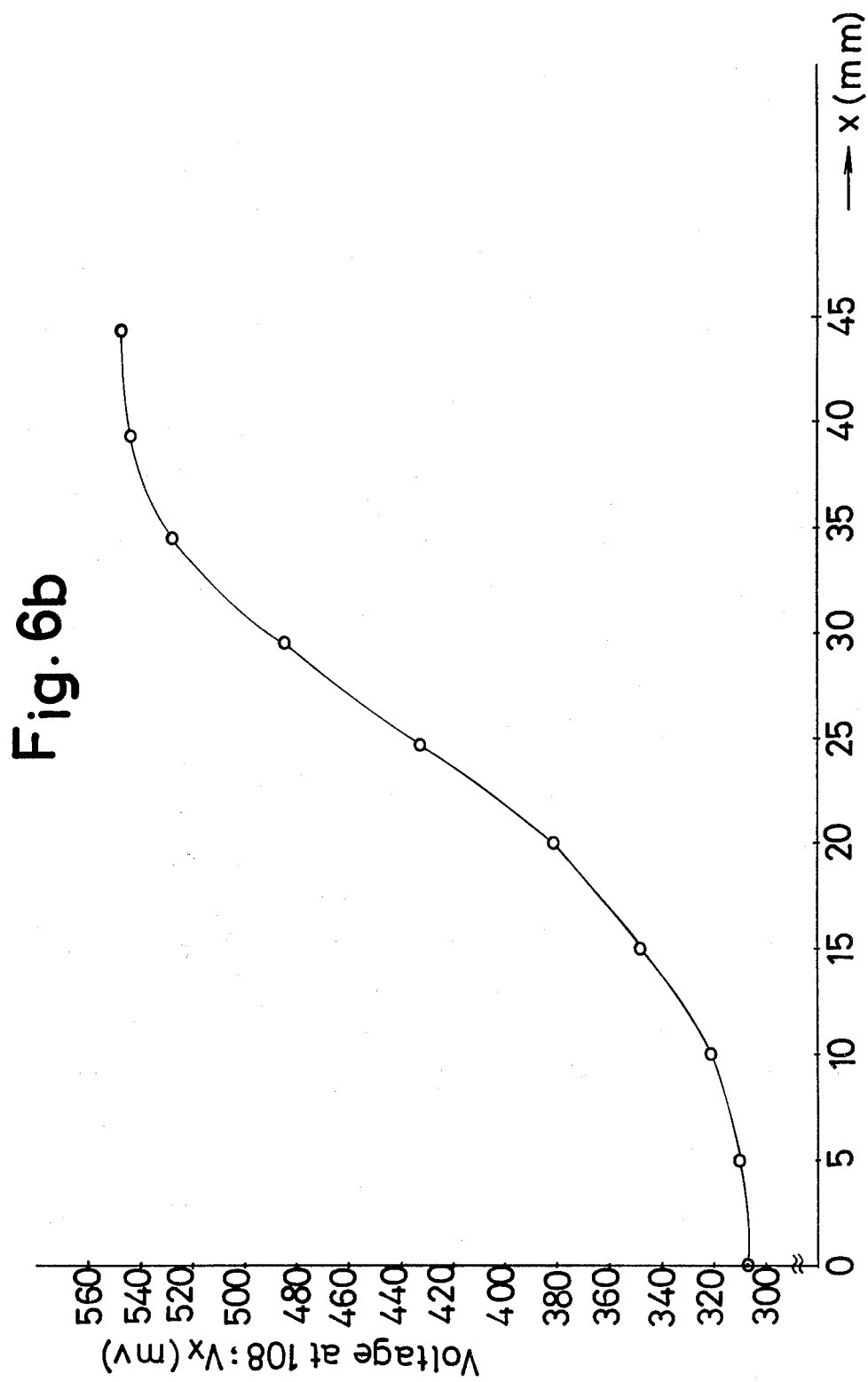
Figure 11:
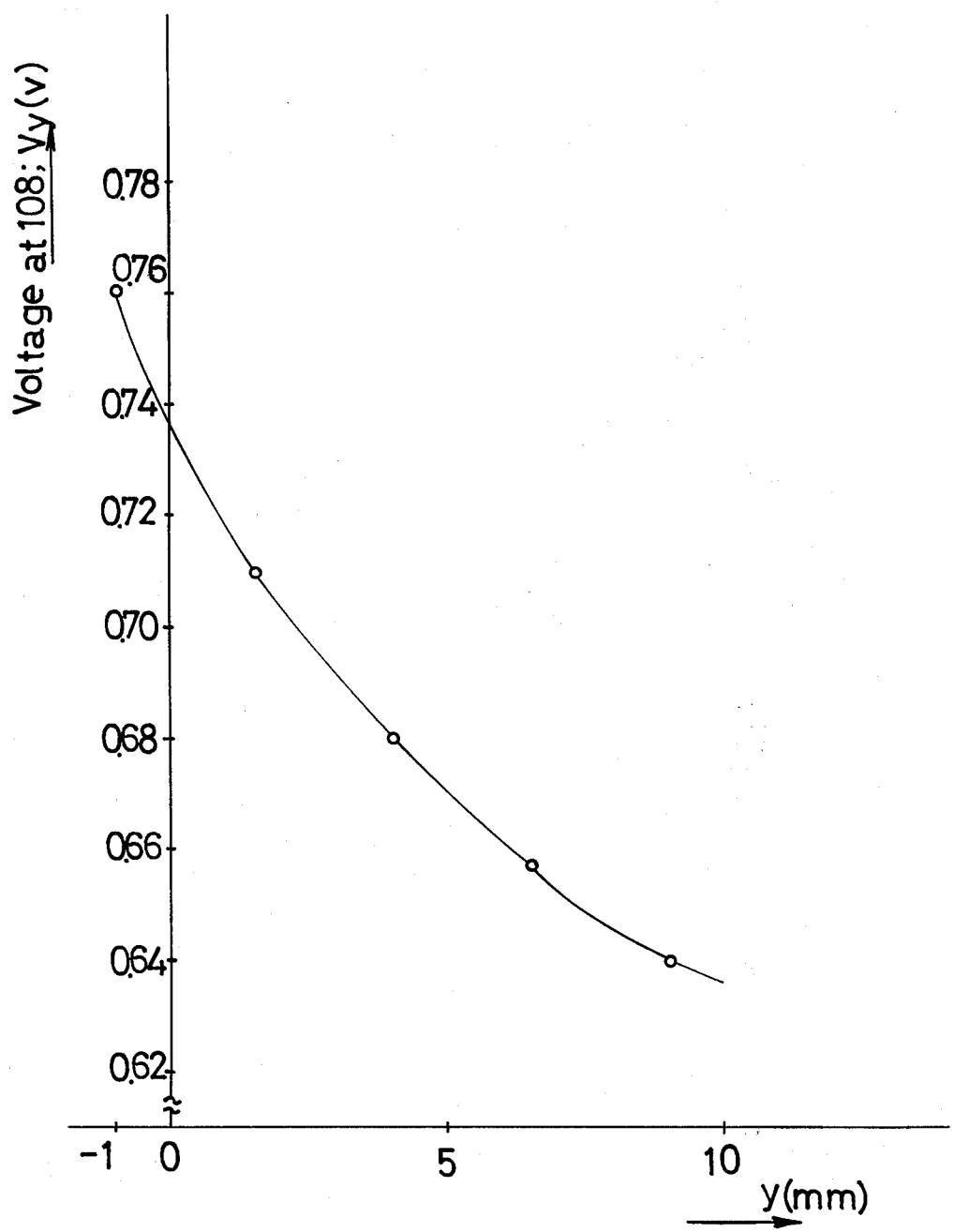
FIG. 11 is a graph which shows voltage data indicative of a time lag of the ferromagnetic member shown in FIGS. 10a and 10b with respect to its displacement position.
Figure 13A:
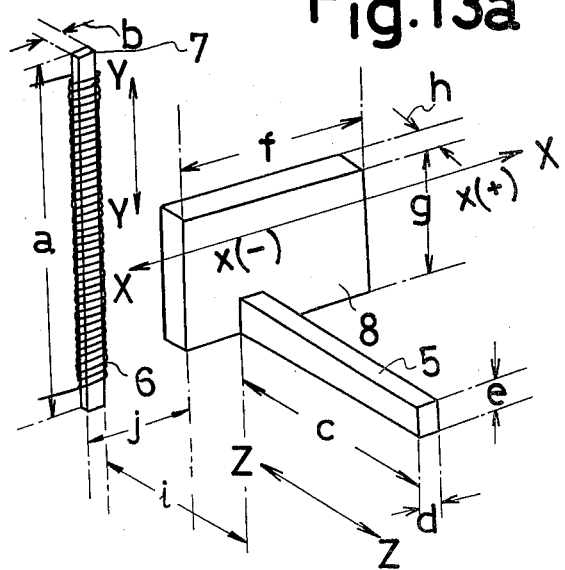
FIG. 13a is a perspective view illustrating the relative position of a ferromagnetic member to a magnetically soft member and a permanent magnet, when time lag of electrical coils shown in FIG. 12 is determined experimentally.
Figure 15A:
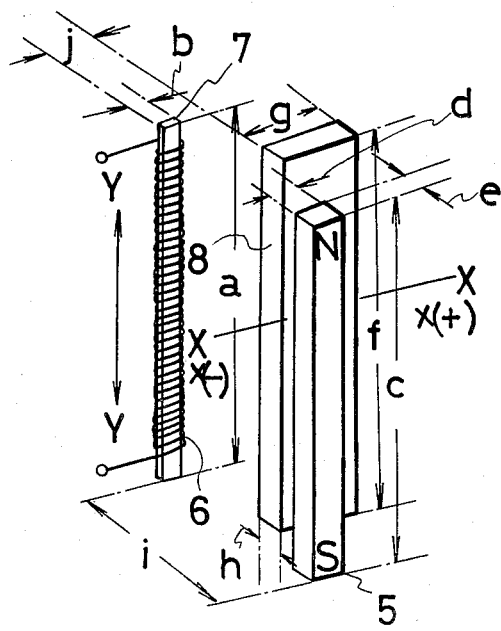
FIG. 15a is a perspective view illustrating the relative position of a ferromagnetic member to a magnetically soft member and a permanent magnet, when time lag of electrical coils in FIG. 14a is determined experimentally.
Figure 15B:
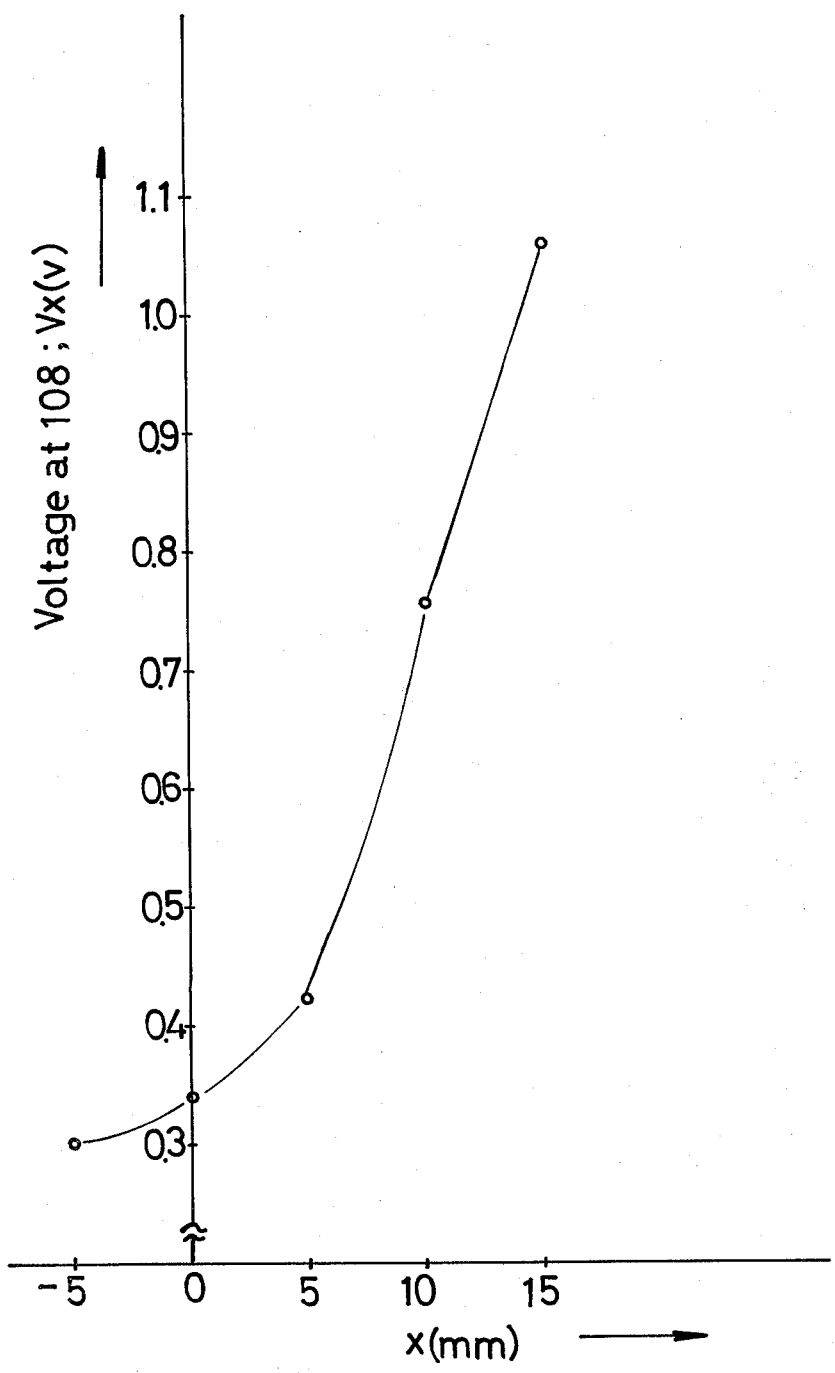

| Case No. | ferromagnetic member 8 | | | | Spacing | | Measuring means & frequency of input pulse | Voltage polarity | Data |
| | material atomic weight percent | f mm | g mm | h mm | i mm | j mm | | | |
| --- | --- | --- | --- | --- | --- | --- | --- | --- | --- |
| 1 | Fe$_{81}$B$_{13.5}$Si$_{3.5}$C$_2$ Amorphous | 50 | 10 | 2 | 40 | 2 | Circuit 100 5 KHz | N—N | FIG. 6b |
| 2 | Fe$_{81}$B$_{13.5}$Si$_{3.5}$C$_2$ Amorphous | " | " | " | " | " | Circuit 120 5 KHz | " | FIG. 6c |
| 5 | Fe$_{81}$B$_{13.5}$Si$_{3.5}$C$_2$ Amorphous | 25 | " | " | 30 | x | Circuit 100 5 KHz | " | FIG. 11 |
| 6 | Fe$_{81}$B$_{13.5}$Si$_{3.5}$C$_2$ Amorphous | " | " | " | 5 | x | Circuit 100 5 KHz | " | FIG. 13a |
| 7 | Fe$_{81}$B$_{13.5}$Si$_{3.5}$C$_2$ Amorphous | 50 | 30 | " | 15 | x | Circuit 100 5 KHz | " | FIG. 15b |

The indication of "N—N" under the column of voltage polarity means that the connection of a coil 6 with the electrical circuit is such that an N-Pole is produced at the upper end of the magnetically soft member 7.

In case No. 1, it is seen from data shown in FIG. 6b that a voltage Vx of a very high linearity and high accuracy can be obtained for the displacement position x of the member in the X—X direction from 0 mm to 45 mm, particularly from 10 mm to 40 mm, and preferably 20 mm to 35 mm. In case No. 2, it is also seen from FIG. 6c that in the range from 0 mm to 45 mm, particularly from 0 mm to 30 mm and preferably from 0 mm to 15 mm, a pulse width td ($\mu$s) of very high linearity and high accuracy can be obtained for the displacement position x of the ferromagnetic member.

Second Embodiment, FIGS. 7a to 9c

FIGS. 7a to 9c illustrate a second embodiment of the invention. In the position sensor 1 shown in FIGS. 7a to 7c, a ferromagnetic member 8 is movably disposed in the X—X direction in response to the operational displacement position of an operation means 13 through the intermediary of a rod 11 and a connecting means 12 so as to move toward or away from a magnetically soft member 7 surrounded by an electrical coil 6, in a manner similar to that noted above with regard to the position sensor shown in FIGS. 1a and 1b. However, it is noted that a separate magnetically soft member 21 surrounded by an electrical coil 20 is disposed in opposing relationship with the magnetically soft member 7 with the permanent magnet 5 interposed therebetween. The electrical coils 6, 20 on the magnetically soft members 7, 20 respectively, are wound on bobbins 22, 23. Both ends of the coils 6, 20 are connected with terminals 24-27. Otherwise, the construction is the same as that of FIGS. 1a and 1b and the same reference numerals are applied and therefore detailed explanation is omitted.

Figure 7A:
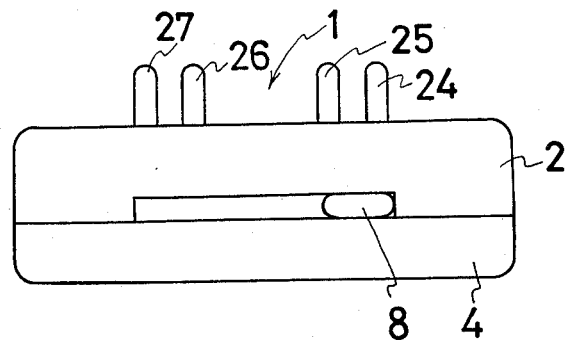
FIG. 7a is a front view of a position sensor according to another embodiment of the invention.
Figure 7B:
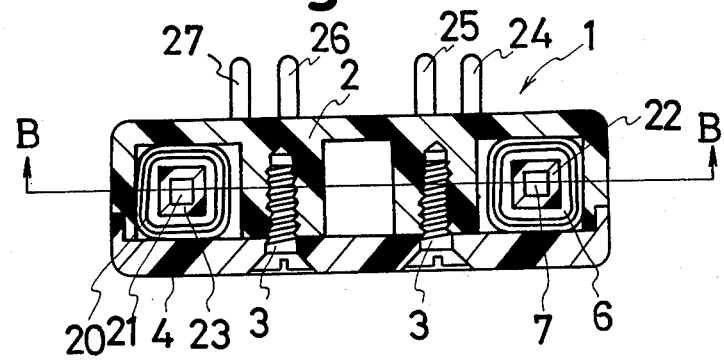
Figure 7C:
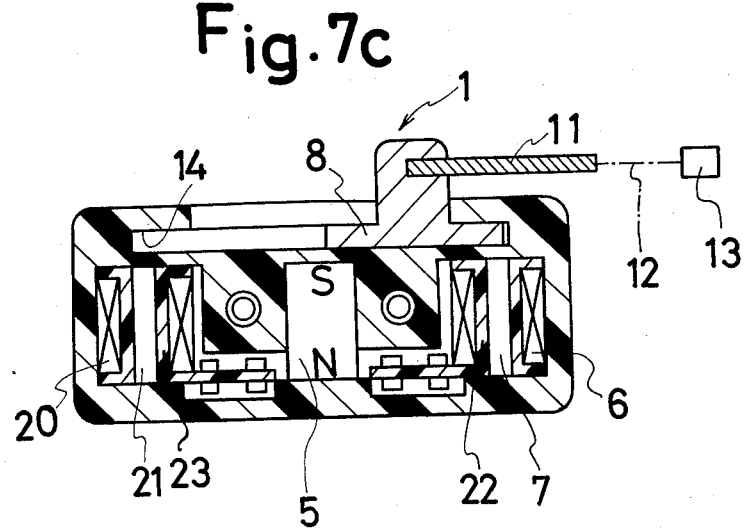
FIG. 7c is a cross-sectional view taken along the line B—B in FIG. 7b.
Figure 8A:
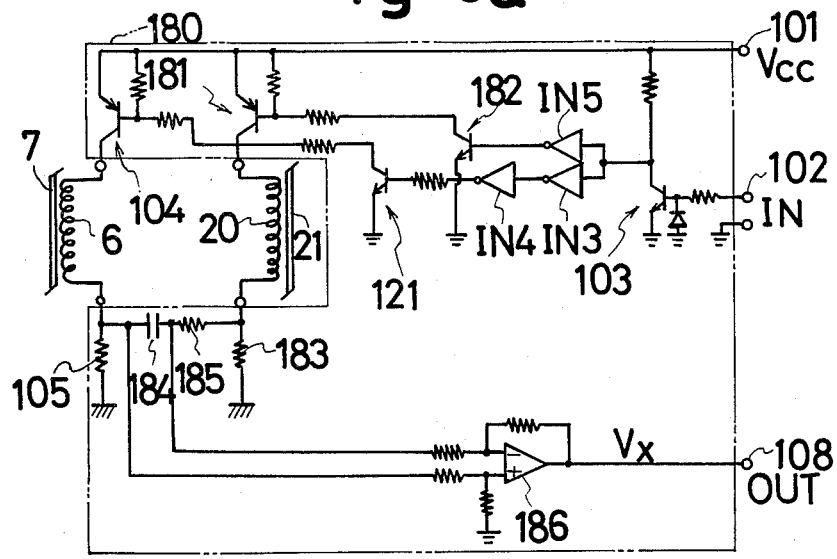
FIG. 8a is a circuit diagram of an electrical processing circuit connected to the position sensor shown in FIGS. 7a-7c for producing an analog voltage of a level which depends on the displacement position detected.

FIG. 8a shows an electrical processing circuit 180 which produces an analog voltage Vx in accordance with the position of the ferromagnetic member 8 in the position sensor shown in FIGS. 7a-6c. Specifically referring to the circuit 180, an NPN transistor 103 is turned on during the time an input voltage pulse (IN) remains at a positive level, and is turned off during the time the input voltage pulse assumes a ground level. The collector voltage of the transistor 103 is amplified and shaped by a pair of inverting amplifiers IN 3 and IN 4 before it is applied to the base of an NPN transistor 121. Thus, when the input voltage pulse (IN) assumes a positive level, the transistor 103 is turned on while the transistor 121 is turned off. Consequently, a PNP transistor 104 is turned off during such time interval. While the transistor 103 is off, the transistor 121 is on and the transistor 104 is on during the time the input voltage pulse assumes the ground level. In other words, the constant supply voltage $V_{CC}$ voltage is applied to the coil 6 in a similar manner as in the circuit 120 of FIG. 3a, whereby a voltage pulse appears across a resistor 105 with a time lag $t_{d1}$ from the falling edge of the input voltage pulse (IN) in a manner corresponding to the distance x1 of the permanent magnet 5 and the magnetically soft member 7 from the ferromagnetic member 8. A constant supply voltage $V_{CC}$ is applied to another electrical coil 20 through a PNP transistor 181. Since the transistor 103 is turned on to cause an inverting amplifier IN 5 to produce a positive output which in turn turns an NPN transistor 182 on during the time the input voltage pulse (IN) assumes a positive level, the transistor 181 is also turned on, while the latter is turned off when the input voltage pulse (IN) assumes a ground level. As a result, a constant supply voltage $V_{CC}$ is applied to the second coil when no voltage is applied to the first coil 6 while no supply voltage is applied to the second coil 20 when a supply voltage is applied to the coil 6. Namely, a supply voltage is applied to the first and second coils 6, 20 in alternate fashion in accordance with the input voltage pulse (IN). The second coil 31 is connected to a resistor 183, across which a voltage pulse appears having a rising end edge which lags behind the rising edge the input voltage pulse (IN) by a time interval of $t_{d2}$ which depends on the distance x2 of the permanent magnet 5 and the magnetically soft member 21 from the ferromagnetic member 8. The voltage Vx1 developed across the resistor 105 is applied to one plate of a capacitor 184, while the voltage Vx2 developed across the resistor 183 is applied to the other plate of the capacitor 184. Since the distance between the member 8 on one hand and the first and the second magnetically soft member 7, 21 on the other hand is represented by $x_1$ and $x_2$, respectively with $x_1+x_2=K$ (constant), and since Vx1 and Vx2 are proportional to the magnitude of $x_1$ and $x_2$, respectively, the potential difference across the capacitor 184 corresponds to the magnitude of $(x_1-x_2)$. The capacitor 184 forms an integrator together with a resistor 185, thus producing a voltage thereacross which corresponds to the magnitude of $(x_1-x_2)$. Since $X_2=k-x_1$, $x_1-x_2=2x_1+k$. Thus, the voltage across the capacitor 184 corresponds to the magnitude of $2x_1$. That is, an analog voltage is obtained which corresponds to twice the travel x1 of the member 8 as referenced to the first magnetically soft member 7. The opposite ends of the capacitor 184 are connected to both inputs of an operational amplifier 186 which is designed as a differential amplifier. The amplifier 186 produces an analog output Vx which corresponds to $2x_1$.

Figure 8B:
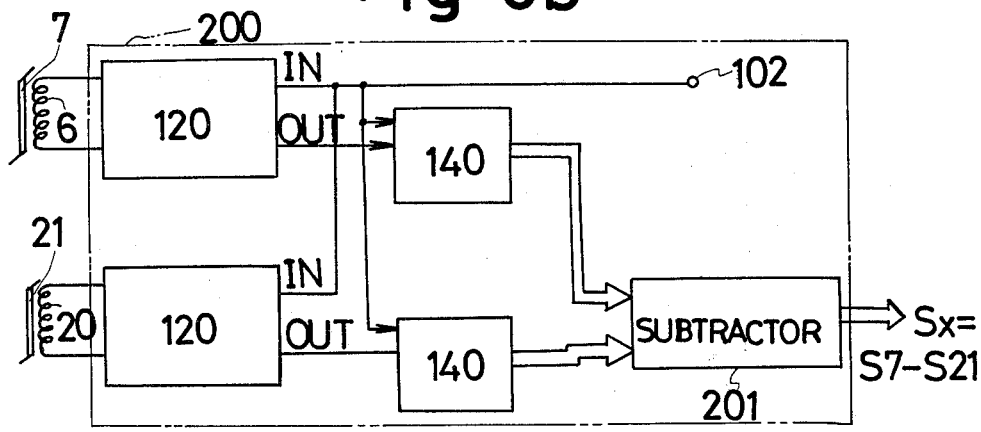
FIG. 8b is a block diagram of an electrical processing circuit connected to the position sensor shown in FIGS. 7a-7c for producing a digital code which represents the displacement position detected.

FIG. 8b shows another electrical processing circuit 200 which provides a pair of pulses which lag behind the rising edge of the input pulse by time intervals of $t_{d1}$ and $t_{d2}$, respectively. These pulses are applied to a pair of counter circuits 140, respectively, where they are converted into a pair of codes S7 and S21 which represent the magnitude of $t_{d1}$ and $t_{d2}$. These codes are applied to a subtractor 201, which calculates $t_{d1}-t_{d2}$, producing a digital output code $S_x=S7-S21$ which represents $t_{d1}-t_{d2}$ or $2x_1$.

Figure 8C:
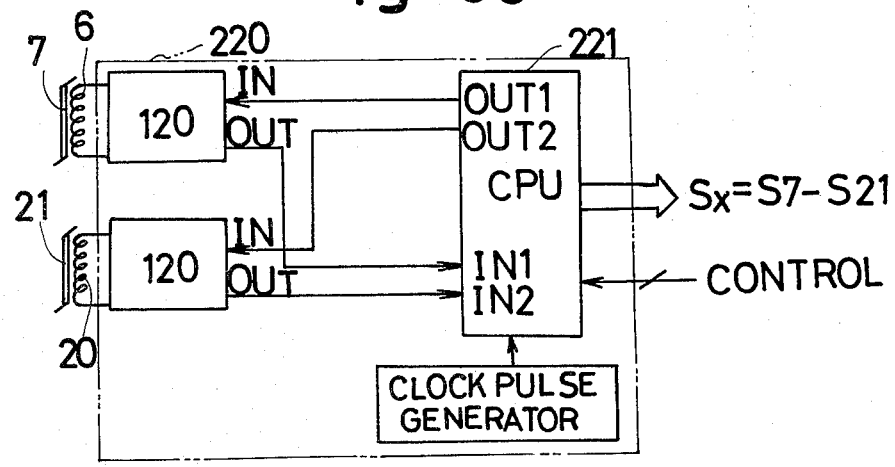
FIG. 8c is a block diagram of an electronic logical processing unit connected to the position sensor shown in FIGS. 7a-7c for producing a digital code corresponding to displacement position detected.

FIG. 8c illustrates an electronic logical processing unit 220 including a single chip microcomputer 221 which applies a single pulse to the circuit 120 connected to the electrical coil 6 while initiating a time counting operation from the rising edge thereof to obtain $t_{d1}$ count data S7, which is retained. Subsequently, the microcomputer applies a single pulse to the circuit 120 connected to the electrical coil 31 while initiating the time counting operation from the rising edge thereof to obtain $t_{d2}$ count data S21. Then, it calculates a difference $(t_{d1}-t_{d2})$, to produce a corresponding output code $SX=S7-S21$. As long as a measurement command control signal is present, the microcomputer continues such operation.

The inventor has determined the value of voltage Vx indicative time lag and pulse width (μs) of time lag as a function of the displacement positin x of the ferromagnetic 8 in the direction of the X—X axis using an arrangement as illustrated in FIG. 9a where the magnetically soft members 7 and 21 are fixedly disposed in parallel relationship with each other with the permanent magnet 5 placed intermediate therebetween them. An axis $X_O$—$X_O$ passing through the magnetically soft members 7, 21 and the magnet 5 in a direction perpendicular to their longitudinal axis is chosen. An X—X axis parallel to the axis $X_O$—$X_O$ and having an origin (x=0) chosen at the position where the ferromagnetic 8 is movably disposed and spaced from the magnetically soft members 7, 21 by a determined distance i, and where the member 8 is positioned midway between the members 7, 21. Parameters a to j including the configuration and the disposition as well materials are indicated in the Table 2 below in correspondence to the associated measured data.

TABLE 2

| Case No. | Magnetically soft member 7.21 | | | | | Coil 6.20 | Permanent magnet 5 (5a) | | |
|---|---|---|---|---|---|---|---|---|---|
| | material atomic weight percent | Thickness mm | a mm | b mm | Number of sheet | Number of turns | c mm | d mm | e mm |
| 3 | Fe$_{40}$Ni$_{40}$P$_{14}$B$_6$ Amorphous | 0.058 | 40 | 5 | 4 | 800 | 40 | 5 | 5 |

TABLE 2-continued

| Case No. | material atomic weight percent | | | | | | | |
|---|---|---|---|---|---|---|---|---|
| 4 | Fe$_{40}$Ni$_{40}$P$_{14}$B$_6$ Amorphous | " | " | " | " | " | " | " | " |

Figure 9B:
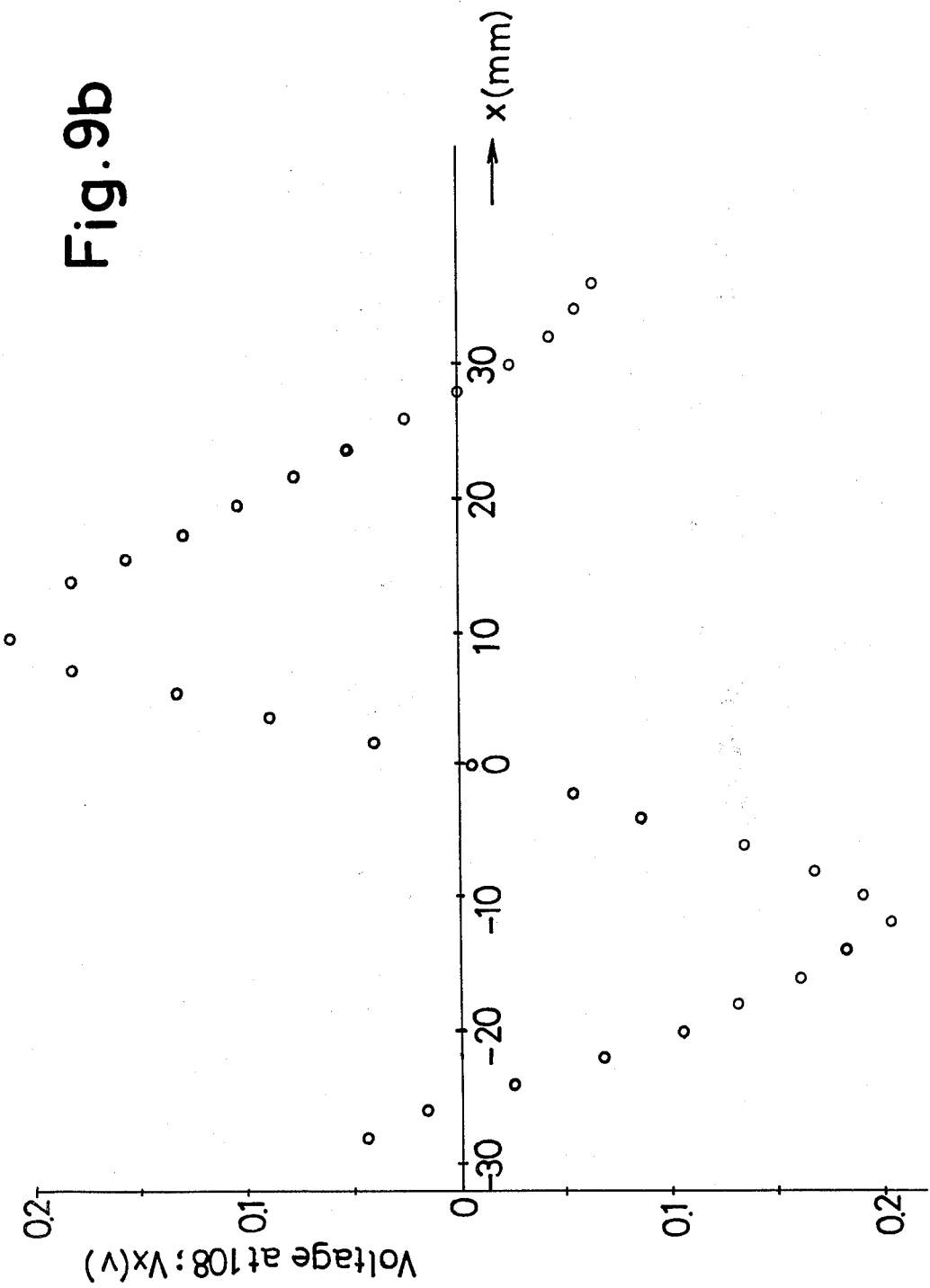

| | | ferromagnetic member 8 | | | Spacing | | Measuring means & frequency of input pulse | Voltage polarity | Data |
|---|---|---|---|---|---|---|---|---|---|
| Case No. | material atomic weight percent | f mm | g mm | h mm | i mm | j mm | | | |
| 3 | Fe$_{40}$Ni$_{40}$P$_{14}$B$_6$ Amorphous | 25 | 10 | 2 | 50 | 5 | Circuit 180 5 KHz | S—N | FIG. 9b |
| 4 | Fe$_{40}$Ni$_{40}$P$_{14}$B$_6$ Amorphous | " | " | " | " | " | 2 circuit 120 5 KHz | N—N | FIG. 9C |

In Table 2, the indication "S-N" under the voltage polarity column means that the connection of the coil with the electrical circuit is such that a N-pole is produced at the upper end of the magnetically soft member 20 and "N—N" means that the connection of the coil with the electrical circuit is such that a S-pole is produced at the upper end of the magnetically soft member.

It is seen from data shown in FIG. 9b that a voltage Vx of a good linearity and high accuracy can be obtained for a displacement position x of the ferromagnetic 8 from −30 mm to −12 mm, from −12 mm to +10 mm, or from 10 mm to 30 mm. In the experimental data shown in FIG. 9c, the electrical processing circuit 120 is connected to the electrical coils 6, 20 respectively, as shown in FIG. 8b and the difference of the time lag td and pulse width μs of a good linearity and high accuracy is obtained in a range of the displacement position x of the ferromagnetic member 8 from −30 mm to −14 mm, from −14 mm to +10 mm or from +10 mm to 26 mm.

Figure 10A:
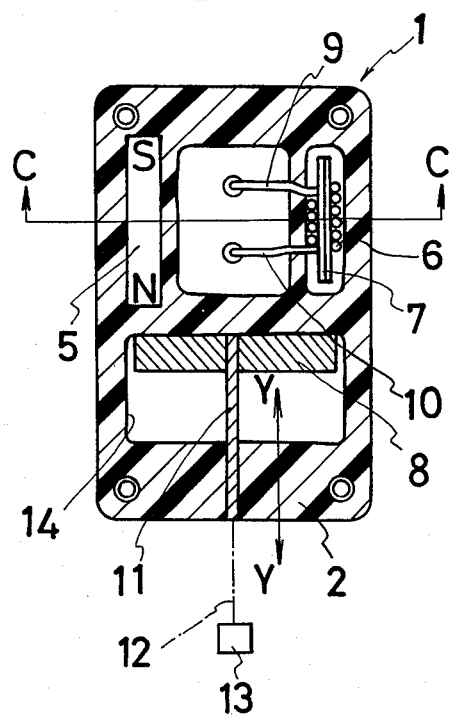
FIG. 10a is a longitudinal cross-sectional view of a position sensor according to a further embodiment of the invention.

Third Embodiment, FIGS. 10a to 11

Figure 10B:
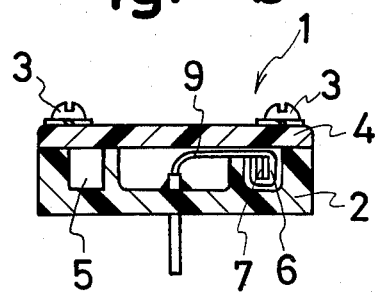

FIGS. 10a to 11 illustrate a third embodiment of the invention. In the position sensor 1 shown in FIGS. 10a, 10b, a permanent magnet 5 and a magnetically soft member 7 surrounded by an electrical coil 6 are arranged generally in the same arrangement as the position sensor shown in FIGS. 1a, 1b. However, it is noted that the longitudinal axis of the ferromagnetic 8 is arranged in the direction normal to the longitudinal axes of the permanent magnet 5 and the magnetically soft member 7. The ferromagnetic member 8 is disposed displaceably in a direction of the longitudinal axis of the permanent magnet 5 and the magnetically soft member 7, namely the Y—Y direction. For the same construction with that in the aforementioned embodiments, the same numeral references are applied and detailed explanation is omitted.

Experimental data for the condition that the ferromagnetic 8 is displaced in the Y—Y direction is shown in FIG. 11, the relationship with respect to materials, size and disposition is shown at case No. 5 in the Table 1. It will be seen from the data illustrated in FIG. 11 that when the displacement position y of the ferromagnetic member 8 is located such that the center of longitudinal axis of the ferromagnetic 8 is in position intermediate between the permanent magnet 5 and the magnetically soft member 7, and a position such that the ferromagnetic member 8 is spaced from the magnetically soft member by 1.0 mm is chosen as the origin (y=0), the position sensor of the invention achieves an output voltage Vy having good linearity with respect to the displacement position and high accuracy in a narrow range of displacement.

Figure 12A:
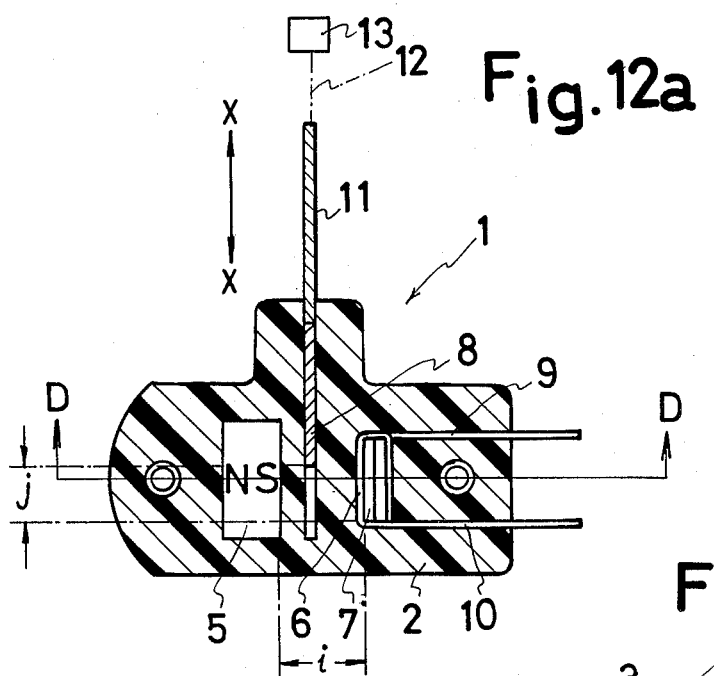
FIG. 12a is a longitudinal cross-sectional view of a position sensor according to a further embodiment of the invention.
Figure 12B:
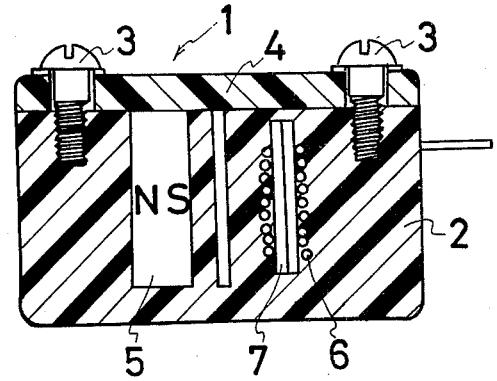
Figure 13B:
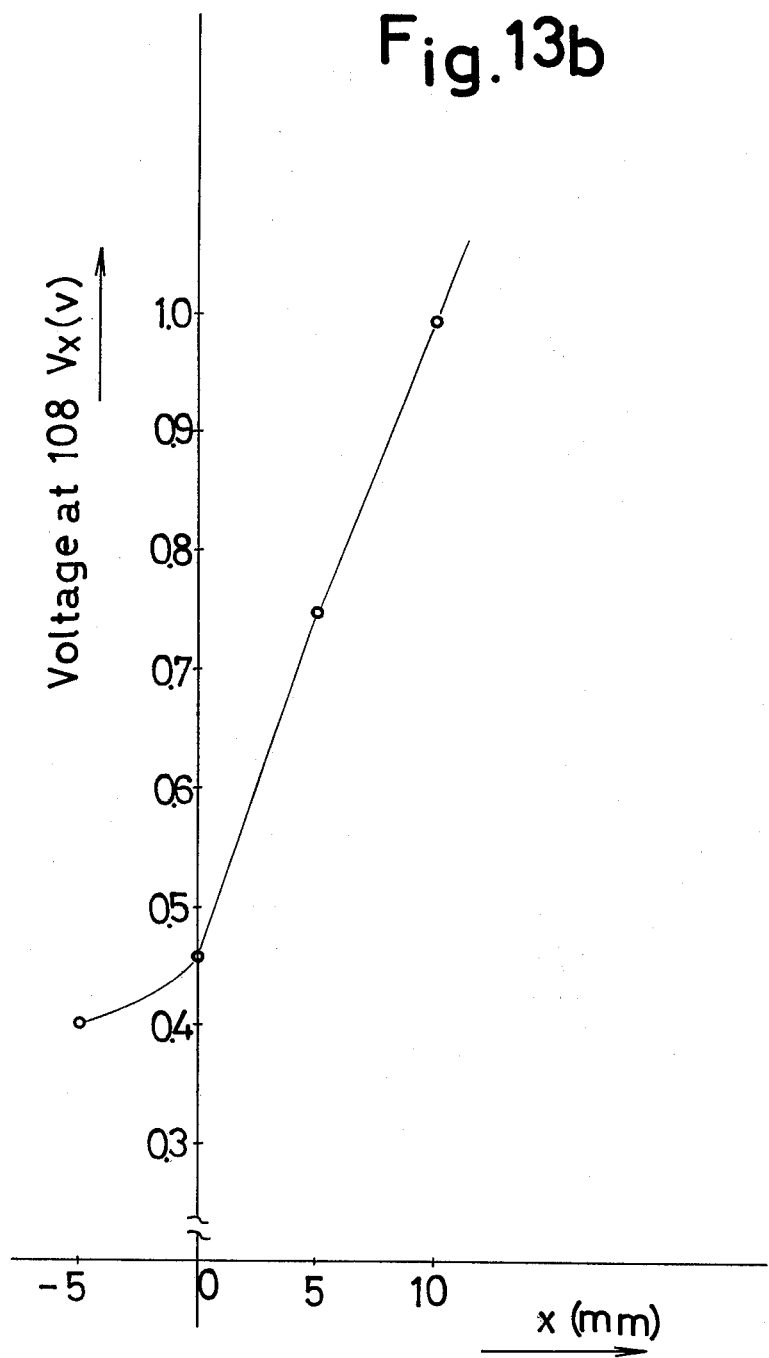

Fourth Embodiment, FIGS. 12-13b

FIGS. 12 to 13b illustrate a fourth embodiment of the invention. In the position sensor shown in FIGS. 12a, 12b, a magnetically soft member 7 and a ferromagnetic 8 have their longitudinal axes in same direction as in the position sensor shown in FIGS. 1a, 1b, (Y—Y, X—X direction, respectively), while a permanent magnet 5 has its longitudinal axis in Z—Z direction. The relationships are shown in FIG. 13a. Otherwise, the construction is same as that of the aforementioned embodiments and therefore the same numeral references are applied.

Experimental data which is obtained as a result of the displacement of the ferromagnetic member 8 in the manner mentioned above is illustrated in FIG. 13b, with the dimensions and layout indicated as Case No. 6 in the Table 1. As indicated in FIG. 13a, the axis of the magnetically soft member 7 is disposed in alignment with the Y—Y direction, the axis of the ferromagnetic member 8 with the X—X direction and the axis of the permanent magnet 5 with the Z—Z direction, and the origin (x=0) is chosen when the distance j between the ferromagnetic member 8 and the magnetically soft member 7 (see FIG. 13a) is zero, with the axis of the ferromagnetic member 8 being located midway between the magnetically soft member 7 and the lefthand end of the permanent magnet 5. Using this layout, the inventor has determined the voltage $V_x$ representing the time delay with respect to the travel x of the ferromagnetic member 14 in the X—X direction relative to the magnetically soft member 20. FIG. 13b illustrates the resulting data obtained where it will be noted that an output voltage $V_x$ having a good linearity and a high accuracy is obtained for the travel x of the ferromagnetic member 14 between 0 and 10 mm.

Figure 14A:
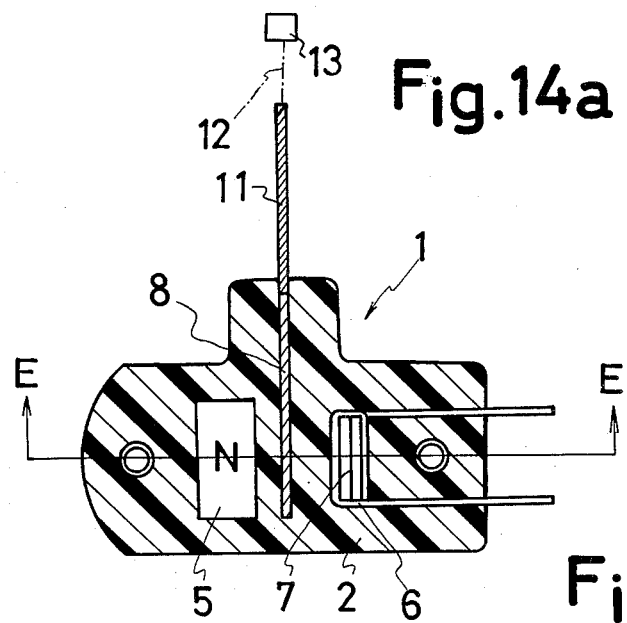
FIG. 14a is a longitudinal cross-sectional view of a position sensor according to a further embodiment of the invention.
Figure 14B:
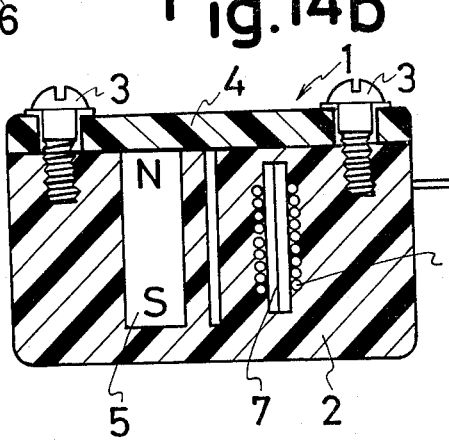

Fifth Embodiment, FIGS. 14a to 15

Figure 16A:
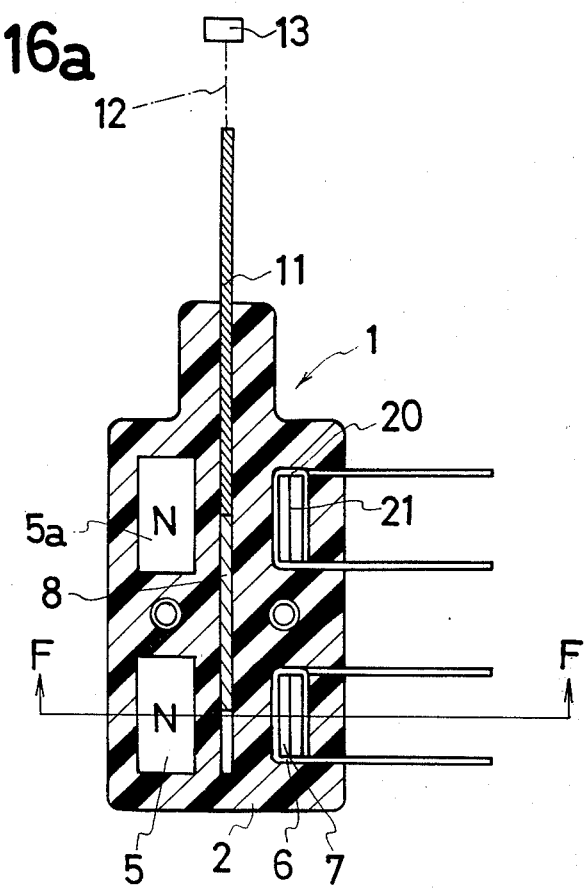
FIG. 16a is a longitudinal cross-sectional view of a position sensor according to a further embodiment of the invention.
Figure 16B:
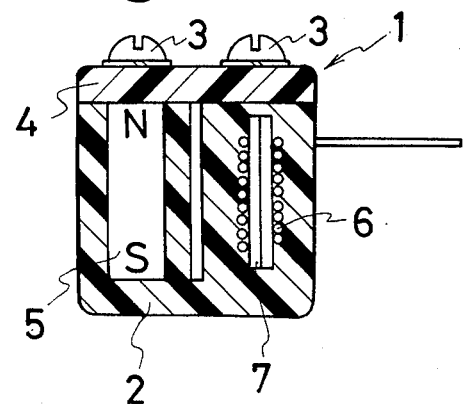

FIGS. 14a to 15 illustrate a fifth embodiment of the invention. In the position sensor 1 shown in FIGS. 14a, 14b, a ferromagnetic member 8 having a longitudinal axis in the Y—Y direction is disposed at an intermediate location between a permanent magnet 5 and a magnetically soft member 7 surrounded by an electrical coil 6, each having a longitudinal axis in same direction, respectively. For the same construction as that described in the aforementioned embodiments, the same numeral references are applied and the detailed explanation thereof is omitted. Experimental data for the condition that the ferromagnetic 8 disposed as above mentioned is displaced in the X—X direction is shown in FIG. 15b and the relationships of shape, size and disposition here shown at case No. 7 in Table 1. The inventor has arranged the center of the ferromagnetic member 8 in the center of each longitudinal axis of the magnetically soft member 7 and the permanent magnet 5 as shown in FIG. 16a and chosen the ferromagnetic member 14 as the origin (x=0) with distance j being between the ferromagnetic 8 moving in the X—X direction and the magnetically soft member 7 shown in FIG. 16a, and then determined the voltage Vx indicative of time lag in respect to travel x of the member 14 in the X—X direction. It will be seen from the data shown in FIG. 15b that the output voltage exhibits good linearity in the range of displacement position x of the ferromagnetic member varying from 5 mm to 15 mm and a position sensor output voltage having high accuracy is obtained.

Other Embodiments, FIGS. 16a to 18b

FIGS. 16a to 18b illustrate other embodiments of the invention. In the position sensor shown in FIGS. 16a, 16b, a permanent magnet 5, a magnetically soft member 7 surrounded by an electrical coil 6 and a ferromagnetic 8 are arranged as shown in FIGS. 14a, 14b, but it will be noted that a permanent magnet 5a and a magnetically soft member 21 surrounded by an electrical coil 20 are disposed in the Y—Y direction. It will be apparent that this embodiment is also operable as a position sensor by connection thereof to the detecting circuit shown in FIGS. 8a, 8b and 8c.

Figure 17A:
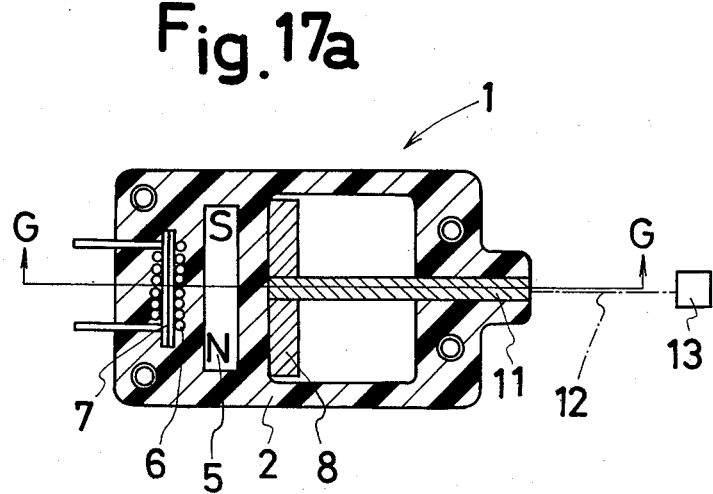
FIG. 17a is a longitudinal cross-sectional view of a position sensor according to a further embodiment of the invention.
Figure 17B:
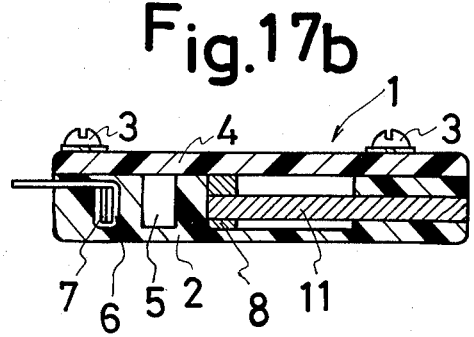
Figure 18A:
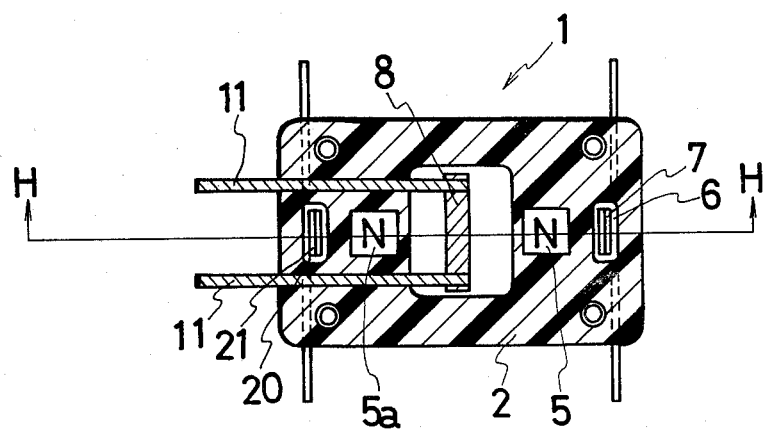
FIG. 18a is a longitudinal cross-sectional view of a position sensor according to a further embodiment of the invention.
Figure 18B:
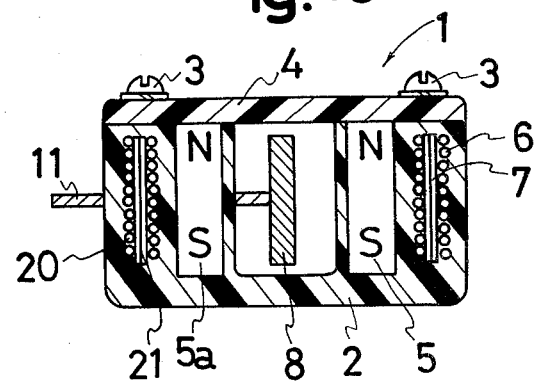

In the position sensor 1 shown in FIGS. 17a, 17b, each longitudinal axis of a permanent magnet 5, a magnetically soft member 7 surrounded by an electrical coil 6 and a ferromagnetic member 8 is disposed in the Y—Y direction and in the order shown in FIG. 17a and the ferromagnetic member 8 is displaceable in the X—X direction. Further, in the position sensor 1 shown in FIGS. 18a, 18b, a ferromagnetic member 8 having its longitudinal axis in the Y—Y direction and movable in the X—X direction is disposed at an intermediate location between a pair of permanent magnets 5, 5a and magnetically soft members 7, 21 surrounded by electrical coils 6, 20 each having a longitudinal axis in the Z—Z direction. It will be apparent that these embodiments are also operable as a position sensor by connection to the detecting circuits previously described.

In the described embodiments, each of the magnetically soft members comprises a plurality of sheets of as amorphous magnetic material which exhibits a high magnetic permeability and a high resistance to deformation. However, other magnetic materials may be used for the magnetically soft members in carrying out the invention. For example, μ metal consisting of $Ni_{80}Fe_{16}Mo_4$ for supermalloy consisting of $Ni_{80}Fe_{20}$ may be used. The material atomic weight percent of these magnetically soft members comprising an amorphous material is not limited to that herein described and other alternatives may be permitted. A magnetically soft member formed of an amorphous material is preferably used for applications which requires a high resistance to oscillations and to deformation.

Some magnetically soft materials are described in Hasegawa et al, "Soft Magnetic Properties of Metallic Glasses—Recent Developments", J. Appl. Phys. 50(3), March 1979, pp. 1551-1556. Magnetically soft materials are sold under the trademark METGLAS (TM) by Allied Chemical Corp.

The operation means of which operational displacement position is to be detected may be a throttle valve associated with an accelerator of a vehicle, a diaphragm type movable actuator disposed in an exhaust gas purifying system and actuated by a load pressure to purify the exhaust gas or a float for detecting the brake fluid level of a vehicle. Other forms of operation means are also envisioned for use with the sensor of the invention.

Having now fully set forth both the structure and operation of preferred embodiments of the concept underlying the present invention, various other embodiments as well as certain variations and modifications of the embodiments herein shown and described will obviously occur to those skilled in the art. It is to be understood, therefore, that within the scope of the appended claim, the inventions may be practiced otherwise than as specifically set forth herein.

What is claimed as new and desired to be secured by Letters Patent of the United States is:

1. A position sensor for detecting operational displacement of an operation means, comprising:
   a ferromagnetic member movable in response to displacement of said operation means;
   permanent magnet means for providing a magnetic field;
   core means including a magnetically soft material disposed adjacent said ferromagnetic member and said permanent magnet means for forming a magnetic circuit therewith;
   at least one electrical coil disposed on said core means;
   detector means for detecting a change of intensity of magnetic flux produced in said core means by the magnetic field of said permanent magnet means in response to a displacement of said strong ferromagnetic member, comprising
   means for applying a pulse voltage to said at least one coil; and
   means for measuring the time delay occurring from the application of said pulse voltage until saturation of said core means.

2. A position sensor according to claim 1, further comprising;
   non-magnetic connection means for connecting said ferromagnetic member to said operation means.

3. A position sensor according to claim 1, in which said core means of magnetically soft material consists of:
   an amorphous magnetic member.

4. A position sensor according to claim 1, in which said ferromagnetic member consists of:
   an amorphous magnetic member.

5. A position sensor according to claim 1, further comprising:
   said core means of magnetically soft material comprising a pair of magnetically soft members disposed adjacent said permanent magnet means at opposite sides thereof.

6. A position sensor according to claim 1, further comprising:
   said permanent magnet means comprising a pair of permanent magnets; and
   a pair of magnetically soft members disposed in opposing relationship with the respective permanent magnets.

* * * * *